United States Patent [19]
Priddle et al.

[11] 3,853,693
[45] Dec. 10, 1974

[54] METHOD FOR QUENCHING GLASS LAMINATES

[75] Inventors: John Edward Priddle, Welwyn; Ronald William Richardson, Bishops Stortford, both of England

[73] Assignee: Imperial Chemical Industries Limited, London, England

[22] Filed: Aug. 14, 1972

[21] Appl. No.: 280,199

[30] Foreign Application Priority Data
Aug. 31, 1971  Great Britain .................... 40533/71

[52] U.S. Cl. ................. 161/203, 156/106, 156/281, 156/334, 161/204
[51] Int. Cl. ........................................... B32b 17/10
[58] Field of Search ............ 156/99, 104, 105, 106, 156/311, 498, 281; 161/203, 204; 65/116

[56] References Cited
UNITED STATES PATENTS
| | | |
|---|---|---|
| 1,959,215 | 5/1934 | Owen .................................. 65/116 |
| 2,400,139 | 5/1946 | Roland ............................... 156/106 |
| 3,344,014 | 9/1967 | Rees ................................... 156/106 |
| 3,532,590 | 10/1970 | Priddle ............................... 156/311 |
| R06,971 | 3/1876 | Bastie ................................. 65/116 |

*Primary Examiner*—Daniel J. Fritsch
*Attorney, Agent, or Firm*—Cushman, Darby & Cushman

[57] ABSTRACT

A method for quenching glass laminates in which a glass laminate comprising a heat-softened crystallisable thermoplastic adhesive sandwiched between sheets of glass is dropped edgewise into for example a water bath.

Also apparatus for carrying out such a process which comprises for example a water bath, means for dropping a glass laminate into the water bath and means for retarding the fall of the laminate so as to prevent its damage by impact.

6 Claims, 3 Drawing Figures

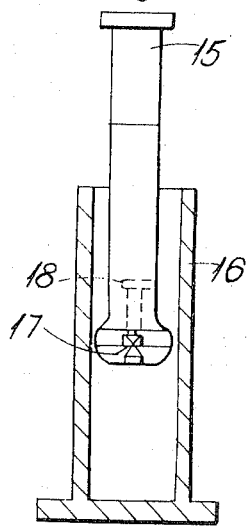
Fig.2
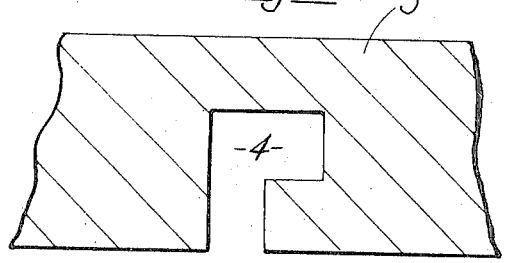
Fig.3
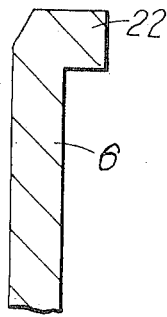

METHOD FOR QUENCHING GLASS LAMINATES

This invention relates to quenching glass laminates.

Glass laminates can be quenched by gentle immersion in a water bath. Such a technique produces a rapid quenching of the outer regions of the laminate but, because of the poor thermal conductivity of glass, the inner regions of the laminate are only quenched slowly. When the inner regions of the laminate comprise a crystallisable thermoplastic adhesive (such as an ethylene copolymer) which is still in a heat-softened state, it is found that a slow quenching often leads to the appearance of haziness. The rate of which quenching occurs can of course be accelerated by using colder water in the water bath, but the use of water which is too cold increases the tendency for the glass to break presumably because there is a maximum rate at which a given piece of glass can be safely quenched. Therefore to safely quench glass laminates, it is necessary to use water of a certain minimum temperature, this temperature being determined by the properties of the glass. It has been found that even when using warm water, a rapid quench of the inner regions of the laminate can be obtained provided the water bath is subjected to intensive agitation requiring the use of expensive stirrers and careful control.

Accordingly by this invention we provide a method of making a bonded glass laminate be sandwiching between sheets of glass one or more layers of crystallisable thermoplastic adhesive, heating the laminate to a temperature above the melting point of the adhesive and thereafter quenching the laminate by immersing it in a volume of cooling liquid wherein the laminate is immersed by allowing it to fall edgewise into the volume of cooling liquid and subsequently subjecting the falling laminate to a retardation force so as to prevent the laminate from sustaining damage by impact. Preferably the cooling liquid is water the temperature of which is thermostatically controlled in the range 30° to 60°C. The precise water temperature chosen will be determined by the dimensions and physical properties of the sheets of glass used in making the laminates.

Clearly the retardation force must not be so great as to impart a damaging shock to the laminate yet the retardation force must be exerted sufficiently to prevent any damage by impact. The laminate is preferably allowed to fall under gravity, but if desired it may be made to fall more quickly into the cooling liquid by use of, for example, a hydraulic ram. The laminate is preferably not subjected to the retardation force until the whole of the laminate has become immersed in the cooling liquid.

It has been found that the turbulence created by the falling laminate in the cooling liquid substantially improves the rate at which the adhesive is quenched and consequently less loss of transparency occurs.

Also according to this invention we provide quenching apparatus comprising a bath for containing a volume of cooling liquid, releasable support means for supporting above the bath a laminate comprising sheets of glass and one or more layers of crystallisable thermoplastic adhesive in a heat-softened state, means by which the laminate can be subjected to a retardation force capable of preventing damage to the laminate by impact and guide means arranged such that on release of the support means the laminate falls and is guided edgewise into the bath to a point where it is subjected to the retardation force. The means by which the laminate can be subjected to a retardation force may comprise a dash-pot. Preferably a dash-pot is chosen which has a smaller internal horizontal cross-sectional area at its base than at its opening. This may be achieved by employing a dash-pot whose internal walls are tapered so that the internal horizontal cross-sectional area of the dash-pot decreases towards the base of the dash-pot. Preferably the internal horizontal cross-sectional area of the dash-pot at its base is up to 20 percent less than the horizontal cross-sectional area of the dash-pot at its opening. The nature of the retardation force experienced by the falling laminate is in part determined by the variations in the internal horizontal cross-sectional area of the dash-pot.

Preferably the bath is provided with means for thermostatically controlling the temperature of the cooling liquid. The apparatus may also comprise means, such as a hydraulic ram, for accelerating the rate at which the laminate falls into the bath.

A preferred embodiment of the apparatus according to this invention will now be described with reference to the drawings accompanying this specification. In the drawings:

FIG. 2 shows in detail the plunger and dash-pot illustrated in FIG. 1; and

FIG. 3 shows in detail a section of the guide-way and tongue illustrated in FIG. 1.

Figure 1:
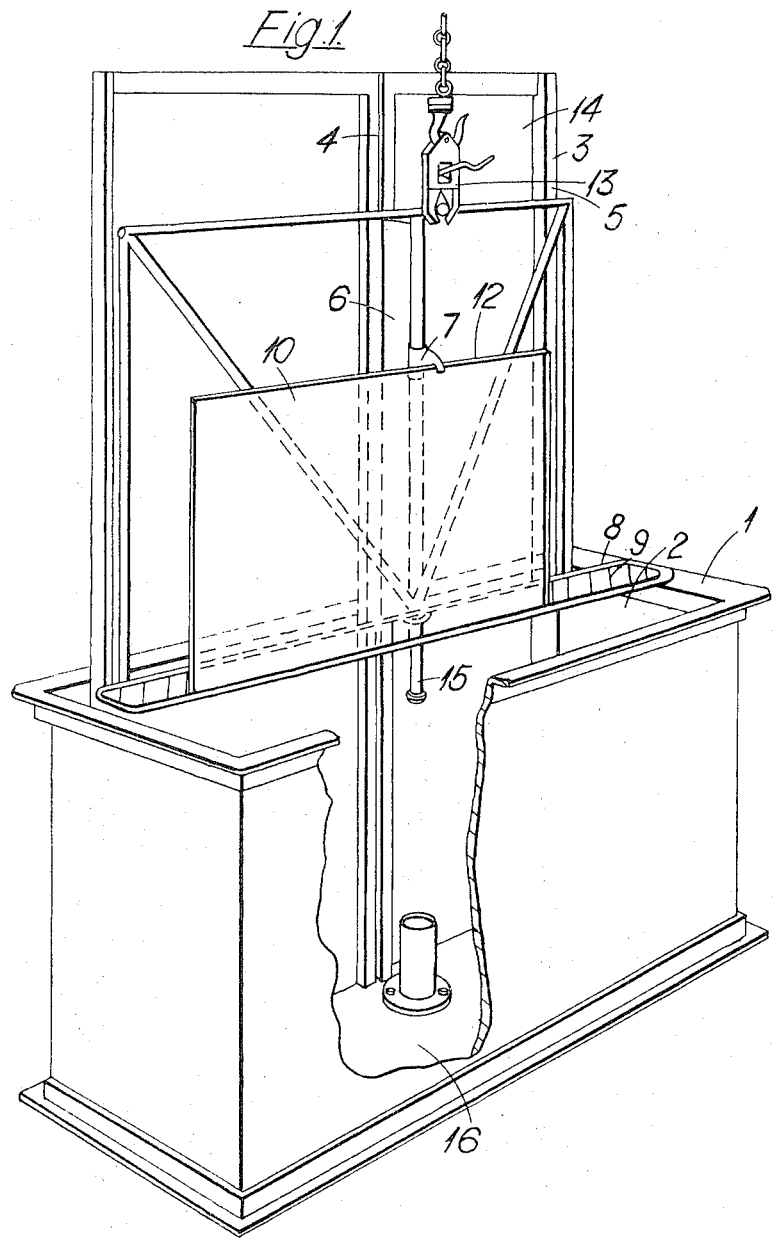
FIG. 1 represents a perspective view of an apparatus according to this invention.

FIG. 1 shows a water bath 1 containing a volume of water 2 deep enough to immerse the whole of laminate 10. Firmly attached to water bath 1 is a guide-frame 3 provided with a guide-way 4. Support frame 5 carries a guide tongue 6 which is engageable with guide-way 4.

Support frame 5 is provided with clamp 7 and basket 8 comprising a wire net 9. A laminate 10 comprising sheets of glass and a crystallisable thermoplastic adhesive in a heat-softened state is carried by support frame 5 such that the leading edge (not shown) of the laminate is supported by wire net 9 and the trailing edge 12 of the laminate is held by clamp 7. Support frame 5 is in turn releasably supported by a quick release mechanism 13 carried by grab 14.

Support frame 5 also carries a plunger 15 which is engageable with dash-pot 16. FIG. 2 shows that the inside walls of dash-pot 16 are tapered so that the internal diameter of the dash-pot 16 decreases towards the base of the dash-pot. Plunger 15 contains a check valve 17 and a vent 18 to facilitate removal of the plunger from the dash-pot.

FIG. 3 shows that guide-way 4 comprises an 'L'-shaped channel engageable by guide tongue 6 which carries a flange 22.

In operation, laminate 10 is rested edgewise in wire net 9 and then clamped in position by means of clamp 7. Frame 5 is then positioned so as to bring tongue 6 into engagement with guide-way 4. Next the quick release mechanism 13 is opened allowing support frame 5 and with it laminate 10 to fall edgewise into the volume of water 2. After the whole of laminate 10 has become immersed, plunger 15 engages dash-pot 16 and a retarding force is imparted to laminate 10 via support frame 5 so as to prevent damage to laminate 10 by impact against the base of bath 1.

The preferred embodiment described above is designed for use with planar laminates. However, the apparatus can be easily modified to take curved laminates by modifying the shape of basket 8 to match the curve of the laminate. Examples of curved laminates include motor vehicle windscreens.

Many suitable crystallisable thermoplastic adhesives may be used to bond together the glass sheets according to this invention. However, we prefer to use an ethylene copolymer in which the ethylene copolymer contains from 5 to 30 percent by weight (based on the weight of the copolymer) of copolymerised units of a comonomer having the general formula $$CH_2=CR-CO_2H$$

where R represents hydrogen or methyl or ethyl groups. The comonomer is preferably methacrylic acid. The copolymer may optionally also contain copolymerised units of ethylenically unsaturated esters such as vinyl acetate or alkyl esters of acrylic acid or methacrylic acid, especially methyl, ethyl or butyl esters.

We claim:

1. In a method of making a bonded glass laminate wherein one or more layers of crystallisable thermoplastic adhesive are sandwiched between sheets of glass and the resulting laminate is heated to a temperature above the melting point of the adhesive and the laminate is thereafter quenched by immerising it in a volume of water, the improvement which comprises:

a. immersing the laminate in the volume of cooling liquid by allowing the laminate to fall edgewise into the water maintained at a temperature of from about 30° to 60°C, and
    b. subsequently subjecting the falling laminate to a retarding force so as to prevent the laminate from sustaining damage by impact.

2. A method according to claim 1 wherein there is sandwiched between sheets of glass one or more layers of crystallisable thermoplastic adhesive which comprises an ethylene copolymer.

3. A method according to claim 2 in which the ethylene copolymer comprises from 5 to 30 percent by weight based on the weight of the copolymer of copolymerised units having the general formula $CH_2 = CR-CO_2H$ where R represents hydrogen or methyl or ethyl groups.

4. A method according to claim 3 wherein the copolymer also comprises copolymerised units of ethylenically unsaturated esters selected from the group consisting of vinyl acetate and the methyl, ethyl or butyl esters of acrylic or methacrylic acids.

5. A method according to claim 1 wherein the laminate is allowed to fall edgewise into the water by gravity.

6. A glass laminate made by the method according to claim 1.

* * * * *